July 29, 1952      O. L. LANDAAL      2,605,009
FOOD GUARD
Filed March 1, 1951
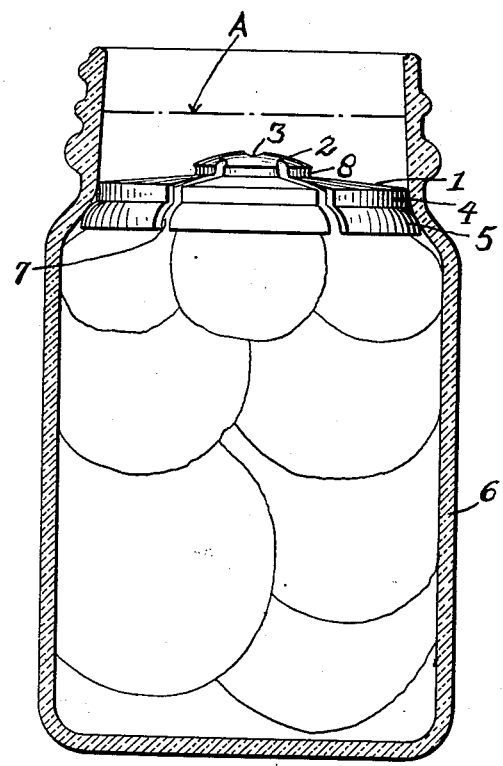
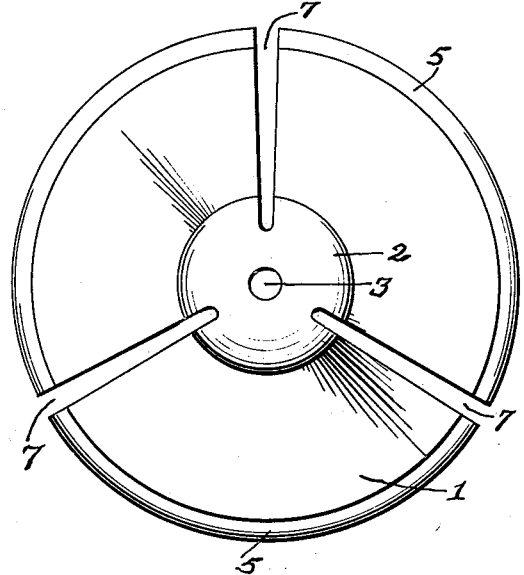
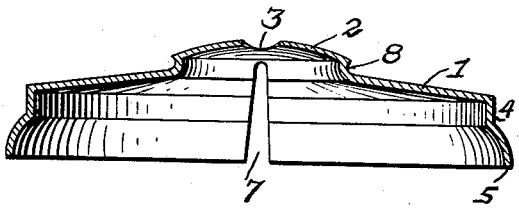
INVENTOR,
Olga L. Landaal.
BY
E. E. Vrooman & Co.,
ATTORNEYS.

Patented July 29, 1952

2,605,009

UNITED STATES PATENT OFFICE 2,605,009

FOOD GUARD

Olga L. Landaal, San Jose, Calif.

Application March 1, 1951, Serial No. 213,374

1 Claim. (Cl. 215—81)

This invention relates to a food guard.

An object of this invention is the production of a guard to prevent discoloration and spoilage of home canned foods caused by the solid contents rising above the liquid, during processing, and pressing on the jar lid thereby causing a weak seal.

Another object of the invention is the construction of a one-piece guard of suitable acid resistant material to fit exactly in the lower portion of the mouth of a standard glass fruit jar.

A still further object of the invention is the construction of a single piece guard of a general hollow structure, which can be compressed sufficiently to enable the guard to be placed in a container, and then upon the guard being released, it will expand sufficiently to hold the guard in its correct position within said container against accidental displacement.

With the foregoing and other objects in view, this invention comprises certain novel constructions, combinations, and arrangements of parts as will be hereinafter fully described, illustrated in the accompanying drawings, and more particularly pointed out in the appended claim.

In the drawings:

Figure 1 is a view in side elevation of a device constructed in accordance with this invention, showing same in an ordinary glass fruit jar.

Figure 2 is a top plan view.

Figure 3 is a vertical, central, sectional view.

Referring to the drawing, in which the preferred embodiment of this invention is illustrated, 1 designates the body of the guard, which is slightly sloped. Integral with the body 1 is a slightly convex hub 2. This hub 2 is provided with a central aperture or opening 3. On the outer edge of the body 1 is a vertical annular portion 4, and depending from said annular portion 4 is an apron 5. The apron 5 is slightly curved to assist in holding the guard in the fruit jar 6. The apron 5 also fits the contents of the fruit jar 6 without injuring same.

The guard is also provided with radiating slots 7. These slots 7 permit the guard to be depressed sufficiently to allow the guard to be placed in a container, as shown in Fig. 1. Then upon being positioned, the sections of the guard will expand sufficiently to hold the guard from accidental displacement.

The body 1 and hub 2 are provided with an annular socket 8, which constitutes a grip-portion, which can be engaged by the operator when placing the guard in a container, or when it is desired to remove the guard from a container. This annular grip 8 is an essential part of this invention.

It is to be noted that this guard is of a general dished structure.

The opening 3 permits any air or bubbles to escape.

In filling the container or jar, the fruit or other contents is first placed in the container, then the guard is positioned, as shown in Fig. 1, to be followed by pouring in sufficient liquid to the height of the line A in Fig. 1. By this method, the contents of the jar are kept in perfect condition, with no discoloring or objectionable results occurring.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

In a food guard for use in jars having a downwardly directed internal shoulder, a sheet metal member having a cylindrical portion adapted to fit within the neck of the jar, and a downwardly and outwardly flaring portion adapted to engage beneath the shoulder of the jar, said member having a disc-like portion extending inwardly from the upper edge of the cylindrical portion and having an upwardly extending perforated hub at its center, said guard having inwardly extending slots open through the outer part of the hub, the disc-like portion, the cylindrical portion and the flaring portion.

OLGA L. LANDAAL.

REFERENCES CITED

The following references are of record in the file of this patent:

UNITED STATES PATENTS

| Number | Name | Date |
|---|---|---|
| 1,183,714 | Armstrong | May 16, 1916 |
| 1,353,104 | Wetsler | Sept. 14, 1920 |
| 1,421,877 | Weissheier | July 4, 1922 |
| 1,649,580 | Geisler | Nov. 15, 1927 |
| 1,654,914 | Beery | Jan. 3, 1928 |
| 1,954,882 | Marek | Apr. 17, 1934 |
| 1,977,365 | Wolcott | Oct. 16, 1934 |
| 2,214,732 | Kraft | Sept. 17, 1940 |